United States Patent
Hung

(10) Patent No.: US 12,235,789 B2
(45) Date of Patent: Feb. 25, 2025

(54) ELECTRONIC DEVICE

(71) Applicant: PEGATRON CORPORATION, Taipei (TW)

(72) Inventor: Hao-Hsiang Hung, Taipei (TW)

(73) Assignee: Pegatron Corporation, Taipei (TW)

( * ) Notice: Subject to any disclaimer, the term of this patent is extended or adjusted under 35 U.S.C. 154(b) by 41 days.

(21) Appl. No.: 18/318,843

(22) Filed: May 17, 2023

(65) Prior Publication Data

US 2024/0012782 A1     Jan. 11, 2024

(30) Foreign Application Priority Data

Jul. 8, 2022   (TW) ................................. 111125817

(51) Int. Cl.
  *G06F 1/26*     (2006.01)
  *G06F 13/40*    (2006.01)
  *G06F 13/42*    (2006.01)

(52) U.S. Cl.
  CPC .......... *G06F 13/4282* (2013.01); *G06F 1/266* (2013.01); *G06F 13/4022* (2013.01); *G06F 2213/0042* (2013.01); *G06F 2213/40* (2013.01)

(58) Field of Classification Search
  CPC .. G06F 13/4282; G06F 1/266; G06F 13/4022; G06F 2213/0042; G06F 2213/40
  See application file for complete search history.

(56) References Cited

U.S. PATENT DOCUMENTS

| | | | |
|---|---|---|---|
| 2008/0100143 | A1 | 5/2008 | Lipcsei |
| 2016/0365805 | A1* | 12/2016 | Guo ........................ G06F 1/26 |
| 2018/0275732 | A1* | 9/2018 | Chen ...................... G06F 1/263 |
| 2019/0197009 | A1 | 6/2019 | Chen et al. |
| 2019/0341786 | A1* | 11/2019 | Lee .................... H02J 7/00304 |
| 2021/0232196 | A1* | 7/2021 | Sultenfuss ............... H02J 7/02 |

FOREIGN PATENT DOCUMENTS

TW        201743161      12/2017

* cited by examiner

*Primary Examiner* — Zahid Choudhury
(74) *Attorney, Agent, or Firm* — J.C. PATENTS

(57) ABSTRACT

An electronic device includes a first power input end, a second power input end, a detection circuit, and a power delivery controller. The first power input end is adapted for coupling to an alternating current adapter. The second power input end is adapted for coupling to a dual-role port device. The detection circuit is coupled to the first power input end and the second power input end. The power delivery controller is coupled to the detection circuit and configured to control the dual-role port device to switch from a source end to a sink end in response to the detection circuit detecting that the first power input end receives an adapter source voltage from the alternating current adapter and the second power input end bring to the dual-role port device.

10 Claims, 3 Drawing Sheets

— ELECTRONIC DEVICE —

CROSS-REFERENCE TO RELATED APPLICATION

This application claims the priority benefit of Taiwan application serial no. 111125817, filed on Jul. 8, 2022. The entirety of the above-mentioned patent application is hereby incorporated by reference herein and made a part of this specification.

BACKGROUND

Technical Field

The disclosure relates to an electronic device and particularly relates to an electronic device that can automatically switch the role of an external dual-role port device.

Description of Related Art

A Universal Serial Bus (USB) Power Delivery (PD) is a USB supply expansion standard that utilizes USB cables to supply and receive power up to 100 Watt (W). Since the USB PD can supply and receive power up to 100 W, devices such as tablets or laptops that were previously not supported can also supply and receive power, and the supporting devices are greatly expanded. Thereby, electronic devices which were once powered by single power supply are gradually developed into dual power supply devices.

Dual power supply electronic devices usually have DC-in jacks or use a USB type-C to supply power, and USB type-C also has a function of power supply and reception. When a device using a dual-role port (DRP) (e.g., a power bank) and the USB type-C connector of a dual power supply device are docked, it is often needed to manually switch the role of the DRP device either to a source end or to a sink end and causes inconvenience for operation.

SUMMARY

The disclosure provides an electronic device capable of dual power supply that controls a DRP device coupled to a second power input end to switch from a source end to a sink end in response to detecting that a first power input end receives an adapter source voltage.

The electronic device of the disclosure includes a first power input end, a second power input end, a detection circuit, and a power delivery controller. The first power input end is adapted for coupling to an alternating current adapter. The second power input end is adapted for coupling to a DRP device. The detection circuit is coupled to the first power input end and the second power input end. The power delivery controller is coupled to the detection circuit and configured to control the DRP device to switch from a source end to a sink end in response to the detection circuit detecting that the first power input end receives an adapter source voltage from the alternating current adapter and the second power input end being coupled to the DRP device.

Based on the above, the DRP device coupled to the second power input end of the electronic device of the disclosure automatically switches from the source end to the sink end based on a reception of the adapter source voltage from the first power input end. Thereby, the electronic device is coupled to the DRP device and the states are switched without manual operations so as to improve the convenience of operation.

To make the aforementioned more comprehensible, several embodiments accompanied with drawings are described in detail as follows.

DESCRIPTION OF THE EMBODIMENTS

The disclosure is to enable a dual power supply electronic device (e.g., a laptop, a tablet, or a cellphone) to directly and automatically switch a DRP device as a source end or a sink end. For instance, in response to the dual power supply electronic device powering a system with a DC-in jack and a Universal Serial Bus (USB) Type-C connector being plugged into a DRP device (e.g., a power bank) at the same time, the electronic device may be used as the source end to directly charge the power bank (SINK) without manual operations.

Furthermore, a controller may be used to distinguish whether an alternating current adapter is plugged into the DC-in jack by analyzing detection signals related to a voltage input of the DC-in jack. In response to the alternating current adapter being plugged into (or electrically connected to) the DC-in jack, the electronic device is set as the source end and the DRP device is set as the sink end, so that the DRP device is charged.

In brief, the disclosure may transfer the detection signals related to the voltage input of the DC-in jack to the general-purpose input/output (GPIO) pins of the controller and read the firmware of the controller. Thereby, in response to the dual power supply electronic device powering the system with the DC-in jack, the electronic device may be used as the source end to directly charge the DRP device (SINK) without manual operations through reading parameters in the firmware of the controller.

Figure 1:
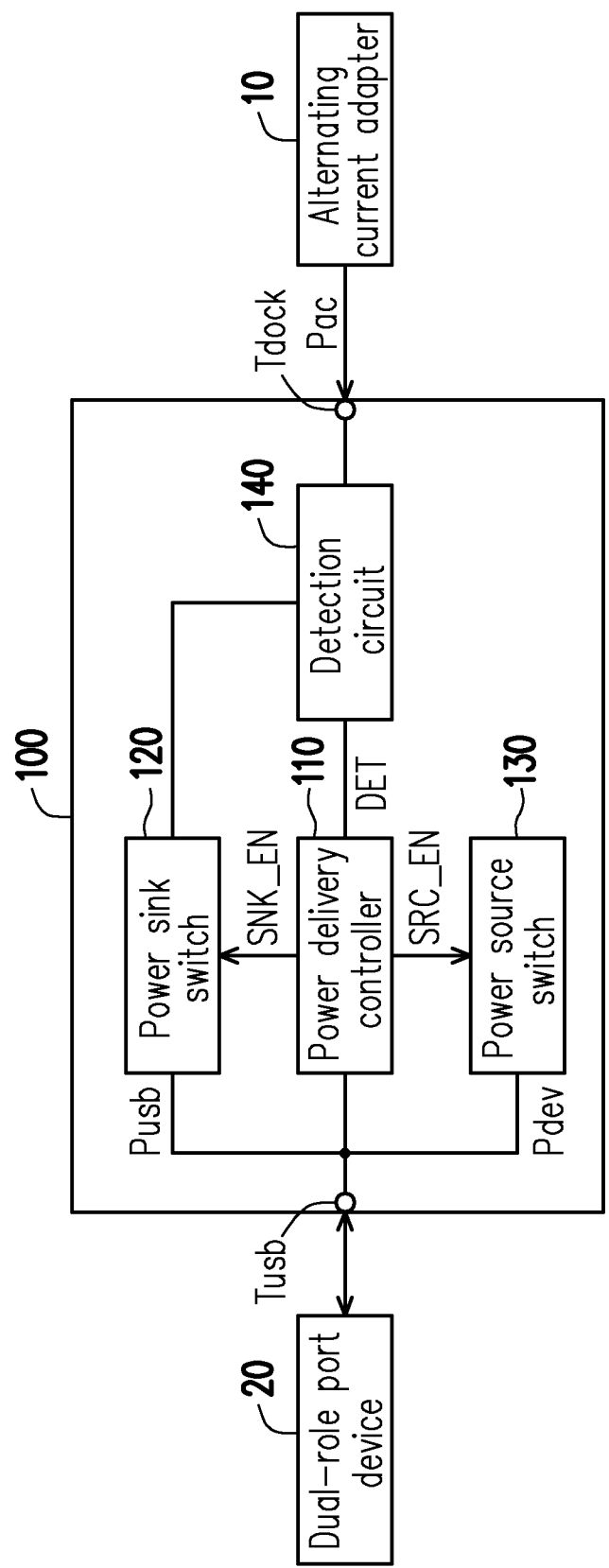
FIG. 1 is a schematic view of a system of an electronic device according to an embodiment of the disclosure.

FIG. 1 is a schematic view of a system of an electronic device according to an embodiment of the disclosure. Referring to FIG. 1, in this embodiment, an electronic device 100 includes at least a first power input end Tdock, a second power input end Tusb, a power delivery controller 110, and a detection circuit 140. The first power input end Tdock is adapted for coupling to an alternating current adapter 10, and the second power input end Tusb is adapted for coupling to a DRP device 20. The detection circuit 140 is coupled to the first power input end Tdock and the second power input end Tusb, and configured to detect whether the first power input end Tdock receives an adapter source voltage Pac and whether the second power input end Tusb is coupled to the DRP device 20. The power delivery controller 110 is coupled to the detection circuit 140 and is configured to control the DRP device 20 to switch from the source end to the sink end in response to the detection circuit 140 detecting that the first power input end Tdock receives the adapter source voltage Pac from the alternating current adapter 10 and the second power input end Tusb being coupled to the DRP device. The detection circuit 140 may provide a detection signal DET to the power delivery controller 110 based on the detection result, and the power delivery controller 110 may control the DRP device 20 based on the detection signal DET.

In this embodiment, the first power input end Tdock may include a DC-in jack, and the second power input end Tusb may include a data transfer interface, such as an USB interface. In an embodiment, the second power input end Tusb may be an USB Type-C interface.

Further, the power delivery controller 110 determines whether the DRP device 20 is used as the source end or the sink end based on the communication with the DRP device in response to the alternating current adapter 10 not being coupled to (or plugged into) the first power input end Tdock and the DRP device 20 being coupled to (or plugged into) the second power input end Tusb. The communication may be conducted through pins of a configuration channel (CC) of the USB interface. That is, the power delivery controller 110 may be coupled to the second power input end Tusb, but the disclosure is not limited thereto. In addition, the power delivery controller 110 ignores the communication with the DRP device 20 and forces the DRP device 20 to be used as the sink end in response to the alternating current adapter 10 being coupled to (or plugged into) the first power input end Tdock and the DRP device 20 being coupled to (or plugged into) the second power input end Tusb. Thereby, the DRP device 20 of the second power input end Tusb automatically switches from the source end to the sink end based on the adapter source voltage Pac from the first power input end Tdock, so as to improve the convenience for operation.

As shown in FIG. 1, the electronic device 100 may further include a power sink switch 120 and a power source switch 130. The power sink switch 120 and the power source switch 130 are both coupled to the second power input end Tusb, and the power sink switch 120 is further coupled to the detection circuit 140. In response to the first power input end Tdock being determined (or detected) to receive the adapter source voltage Pac based on the detection signal DET, the power delivery controller 110 provides a source enabling signal SRC_EN to the power source switch 130 to enable (or turn on) the power source switch 130 and to provide a device source voltage Pdev from the interior of the electronic device 100 to the DRP device 20 through the turned-on power source switch 130. The device source voltage Pdev is about 5V. At this moment, the power delivery controller 110 may not provide a sink enabling signal SNK_EN to the power sink switch 120 to disable (or disconnect) the power sink switch 120.

In the embodiments of the disclosure, in response to the first power input end Tdock being determined to receive the adapter source voltage Pac based on the detection signal DET, the power delivery controller 110 may read the stored operation parameter and, based on the stored operation parameter, provide either the sink enabling signal SNK_EN or the source enabling signal SRC_EN. In other words, the states provided by the sink enabling signal SNK_EN and the source enabling signal SRC_EN are related to the result of the communication between the power delivery controller 110 and the DRP device 20. In the embodiment, reading the operation parameter is a detection behavior associated with reading the firmware of the controller in order to switch the role of the DRP device 20 automatically.

In this embodiment, the sink enabling signal SNK_EN is provided to the power sink switch 120 to enable (or turn on) the power sink switch 120. The turned-on power sink switch 120 receives and transmits an external source voltage Pusb from the DRP device 20 to the interior of the electronic device 100. The range of the external source voltage Pusb is from 5V to 20V. In addition, in response to the sink enabling signal SNK_EN being provided to the power sink switch 120, the power delivery controller 110 may not provide the source enabling signal SRC_EN to the power source switch 130 to disables (or disconnect) the power source switch 130 by not providing the source enabling signal SRC_EN.

Figure 2:
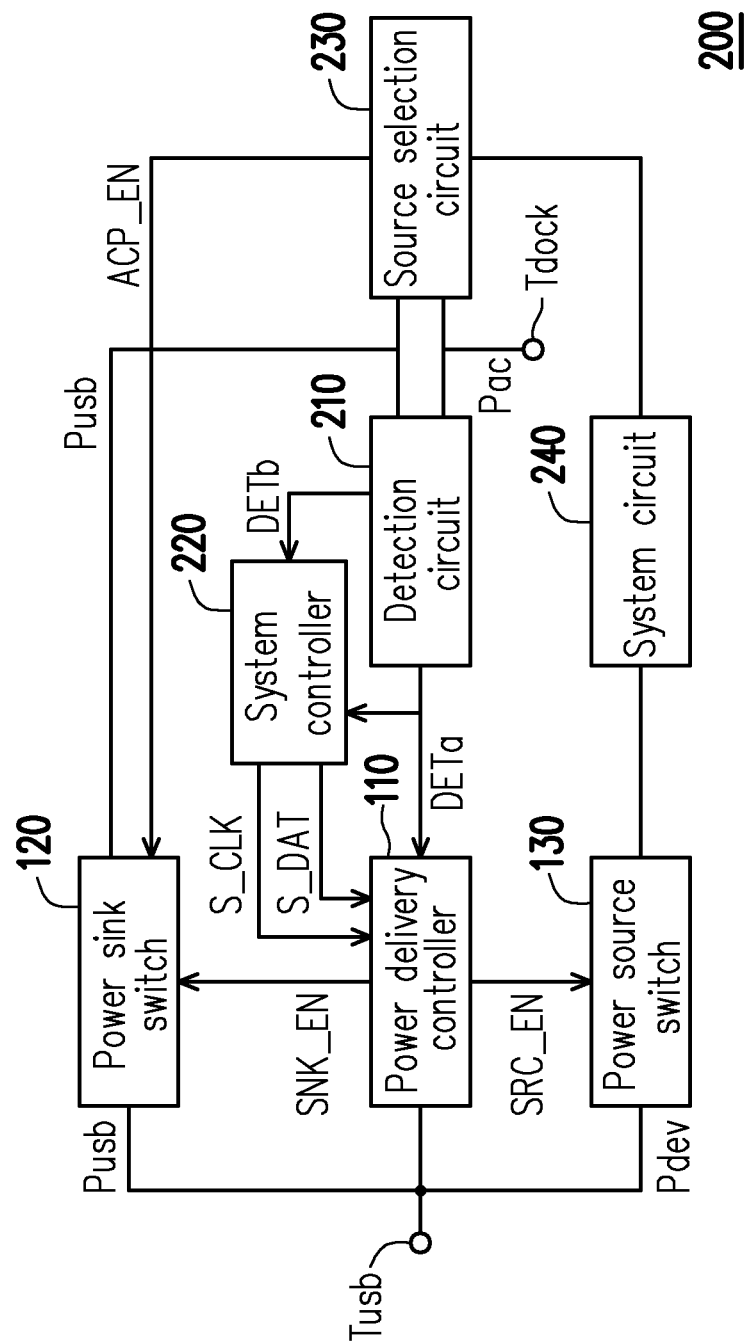
FIG. 2 is a schematic view of a system of an electronic device according to another embodiment of the disclosure.

FIG. 2 is a schematic view of a system of an electronic device according to another embodiment of the disclosure. Referring to FIG. 1 and FIG. 2, in this embodiment, an electronic device 200 is configured to provide further explanations for the electronic device 100, but the disclosure is not limited thereto. The same or similar components are referenced with the same reference numerals or signs. In this embodiment, the electronic device 200 further includes a system controller 220, a source selection circuit 230, and a system circuit 240. A detection circuit 210 may be operated with reference to the detection circuit 140.

The detection circuit 210 is coupled to the first power input end Tdock, the second power input end Tusb, the power delivery controller 110, and the system controller 220. The detection circuit 210 provides a first detection signal DETa to the power delivery controller 110 and the system controller 220 based on a detection of the adapter source voltage Pac, and provides a second detection signal DETb to the system controller 220 based on a detection of the external source voltage Pusb. The power delivery controller 110 reads the operation parameter based on the first detection signal DETa in order to provide the source enabling signal SRC_EN. Besides, the system controller 220 is coupled to the power delivery controller 110 in order to set the operation parameter stored in the power delivery controller 110 based on the first detection signal DETa and the second detection signal DETb. In this embodiment, the system controller 220 may be coupled to the power delivery controller 110 through an inter-integrated circuit ($I^2C$) bus to set the operation parameter stored in the power delivery controller 110, such as utilizing a clock signal S_CLK, a data signal S_DAT, and the power delivery controller 110, but the disclosure is not limited thereto.

In addition, the source selection circuit 230 is coupled to the first power input end Tdock and to the second power input end Tusb through the power sink switch 120 to provide either the received adapter source voltage Pac or the received external source voltage Pusb to the system circuit 240. The adapter source voltage Pac has priority over the external source voltage Pusb. That is, in response to the source selection circuit 230 simultaneously receiving the external source voltage Pusb and the adapter source voltage Pac, the source selection circuit 230 provides the adapter source voltage Pac to the system circuit 240 and stops the external source voltage Pusb from entering the system circuit 240 by using a hardware mechanism. Then, the system circuit 240, based on the adapter source voltage Pac, provides the device source voltage Pdev to the DRP device 20 through the turned-on power source switch 130.

However, after the source selection circuit 230 blocks the external source voltage Pusb by the hardware mechanism, the voltage on the circuit is still high, which affects the operation of the source selection circuit 230. Therefore, the source selection circuit 230 may, based on the adapter source voltage Pac, provide an adapter source enabling signal ACP_EN to the power sink switch 120 to disable the power sink switch 120 based on the adapter source voltage Pac. In addition, the source selection circuit 230 may not provide the adapter source enabling signal ACP_EN to the power sink switch 120 based on not receiving the adapter source voltage Pac to enable (or turn on) the power sink switch 120.

In the embodiments of the disclosure, when the power delivery controller 110 communicates with the DRP device 20 through pins of the configuration channel of an USB interface in order to enable the power sink switch 120, and the source selection circuit 230 receives only the external source voltage Pusb, the source selection circuit 230 provides the external source voltage Pusb from the DRP device 20 to the system circuit 240 through the source selection circuit 230.

Figure 3:
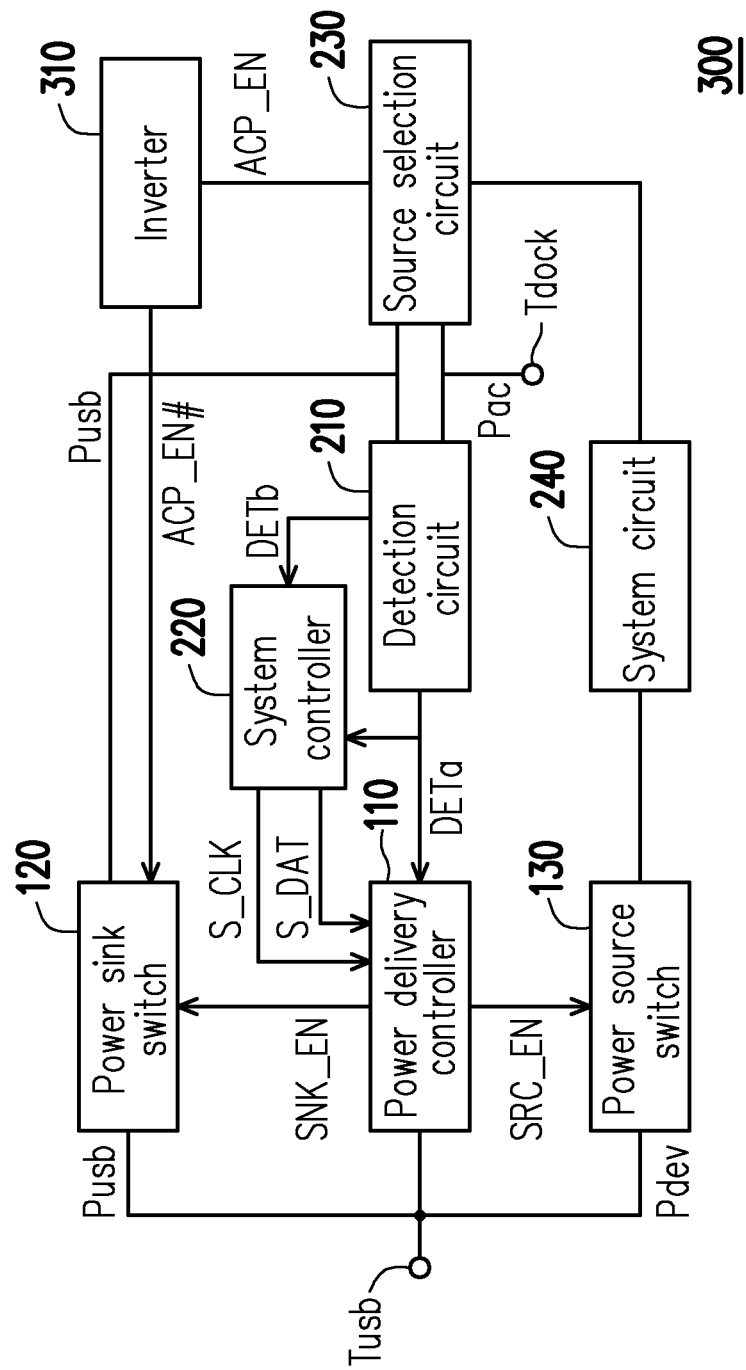
FIG. 3 is a schematic view of a system of an electronic device according to yet another embodiment of the disclosure.

FIG. 3 is a schematic view of a system of an electronic device according to yet another embodiment of the disclosure. Referring FIGS. 1 to 3, in this embodiment, an electronic device 300 is similar to the electronic device 200, and the difference therebetween is that the electronic device 300 further includes an inverter 310. The same or similar components are referenced with the same reference numerals or signs. In this embodiment, after the inverter 310 is used to invert the voltage level of the adapter source enabling signal ACP_EN, an inverted signal ACP_EN # is provided to meet the voltage requirement for disabling the power sink switch 120.

To sum up, in the embodiments of the electronic device 100/200/300 of the disclosure, the DRP device 20 coupled to the second power input end Tusb automatically switches from the source end to the sink end based on the reception of the adapter source voltage Pac from the first power input end Tdock. Thereby, the electronic device 100/200/300 is coupled to the DRP device 20 and the states are switched without manual operations, so as to improve the convenience for operation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   a first power input end, adapted for coupling to an alternating current adapter;
   a second power input end, adapted for coupling to a dual-role port device;
   a detection circuit, coupled to the first power input end and the second power input end; and
   a power delivery controller, coupled to the detection circuit and configured to control the dual-role port device to switch from a source end to a sink end in response to the detection circuit detecting that the first power input end receives an adapter source voltage from the alternating current adapter and the second power input end being coupled to the dual-role port device.

2. The electronic device according to claim 1, further comprising:
   a power sink switch, coupled between the second power input end and a system circuit, and configured to provide an external source voltage from the dual-role port device to the system circuit when being enabled;
   a power source switch, coupled between the second power input end and the system circuit, and configured to provide a device source voltage from the system circuit to the dual-role port device when being enabled;
   wherein the power delivery controller enables the power source switch in response to the detection circuit detecting that the first power input end receives the adapter source voltage, and the power delivery controller enables either the power sink switch or the power source switch in response to the detection circuit detecting that the first power input end does not receive the adapter source voltage.

3. The electronic device according to claim 2, further comprising:
   a source selection circuit, coupled to the power sink switch and the first power input end, and configured to provide either the adapter source voltage or the external source voltage to the system circuit.

4. The electronic device according to claim 3, wherein the source selection circuit disables the power sink switch based on the received adapter source voltage.

5. The electronic device according to claim 3, further comprising a system controller coupled to the detection circuit and the power delivery controller,
   wherein the detection circuit is further configured to provide a first detection signal to the power delivery controller and the system controller in response to the adapter source voltage being detected, and provide a second detection signal to the system controller in response to the external source voltage being detected, wherein the power delivery controller enables the power source switch based on the first detection signal.

6. The electronic device according to claim 5, wherein the system controller is coupled to the power delivery controller through an inter-integrated circuit bus.

7. The electronic device according to claim 5, wherein the power delivery controller stores an operation parameter, and the system controller sets the operation parameter based on the first detection signal and the second detection signal to enable the power source switch.

8. The electronic device according to claim 2, wherein the power delivery controller disables the power sink switch in response to the detection circuit detecting that the first power input end receives the adapter source voltage.

9. The electronic device according to claim 1, wherein the first power input end comprises a connector and the second power input end comprises a data transfer interface.

10. The electronic device according to claim 1, wherein the second power input end comprises a Universal Serial Bus (USB) Type-C interface.

* * * * *